US007979691B2

(12) United States Patent
Stewart et al.

(10) Patent No.: US 7,979,691 B2
(45) Date of Patent: *Jul. 12, 2011

(54) COMPUTER VIRUS PROTECTION

(75) Inventors: Walter Mason Stewart, Potomac, MD (US); Marcelo Carrera, Silver Spring, MD (US); Robert G. Hook, Alexandria, VA (US)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/392,768

(22) Filed: Feb. 25, 2009

(65) Prior Publication Data

US 2009/0165138 A1 Jun. 25, 2009

Related U.S. Application Data

(63) Continuation of application No. 11/140,464, filed on May 31, 2005, now Pat. No. 7,506,155, which is a continuation of application No. 09/704,790, filed on Nov. 3, 2000, now Pat. No. 6,901,519.

(60) Provisional application No. 60/213,254, filed on Jun. 22, 2000.

(51) Int. Cl.
*H04L 9/00* (2006.01)

(52) U.S. Cl. .......... 713/152; 713/151; 713/150; 726/22; 726/24

(58) Field of Classification Search .......... None
See application file for complete search history.

(56) References Cited

U.S. PATENT DOCUMENTS

| 5,623,600 | A | 4/1997 | Ji et al. |
| 5,740,370 | A | 4/1998 | Battersby et al. |
| 5,832,208 | A | 11/1998 | Chen et al. |
| 5,842,002 | A | 11/1998 | Schnurer et al. |
| 5,889,943 | A | 3/1999 | Ji et al. |
| 5,918,054 | A | 6/1999 | Jury et al. |
| 5,940,614 | A | 8/1999 | Allen et al. |
| 5,956,481 | A | 9/1999 | Walsh et al. |
| 6,026,502 | A | 2/2000 | Wakayama |
| 6,092,194 | A | 7/2000 | Touboul |
| 6,094,731 | A | 7/2000 | Waldin et al. |
| 6,170,055 | B1 | 1/2001 | Meyer et al. |

(Continued)

FOREIGN PATENT DOCUMENTS

JP 11-167533 6/1999

(Continued)

OTHER PUBLICATIONS

U.S. Appl. No. 11/971,754 entitled "Computer Network Virus Protection System and Method", Non-Final rejection dated Feb. 24, 2009, inventors Walter Stewart et al., filed Jan. 9, 2008, 7 pgs.

(Continued)

*Primary Examiner* — Pramila Parthasarathy
(74) *Attorney, Agent, or Firm* — Sterne, Kessler, Goldstein & Fox P.L.L.C.

(57) ABSTRACT

A network is protected from e-mail viruses through the use of a sacrificial server. Any executable program or other suspicious parts of incoming e-mail messages are forwarded to a sacrificial server, where they are converted to non-executable format such as Adobe Acrobat PDF and sent to the recipient. The sacrificial server is then checked for virus activity. After the execution is completed, the sacrificial server is rebooted.

48 Claims, 4 Drawing Sheets

U.S. PATENT DOCUMENTS

| | | | |
|---|---|---|---|
| 6,185,678 | B1 | 2/2001 | Arbaugh et al. |
| 6,192,477 | B1 | 2/2001 | Corthell |
| 6,253,324 | B1 | 6/2001 | Field et al. |
| 6,253,367 | B1 * | 6/2001 | Tran et al. ............... 717/108 |
| 6,311,273 | B1 | 10/2001 | Helbig et al. |
| 6,377,691 | B1 | 4/2002 | Swift et al. |
| 6,401,210 | B1 | 6/2002 | Templeton |
| 6,487,664 | B1 * | 11/2002 | Kellum ............... 726/22 |
| 6,487,994 | B2 | 12/2002 | Ahern et al. |
| 6,609,196 | B1 * | 8/2003 | Dickinson et al. ........ 713/154 |
| 6,721,784 | B1 | 4/2004 | Leonard et al. |
| 6,839,741 | B1 | 1/2005 | Tsai |
| 6,901,519 | B1 | 5/2005 | Stewart et al. |
| 7,191,219 | B2 * | 3/2007 | Udell et al. ........... 709/206 |
| 7,263,561 | B1 | 8/2007 | Green et al. |
| 7,487,544 | B2 | 2/2009 | Schultz et al. |
| 7,506,155 | B1 | 3/2009 | Stewart et al. |
| 7,640,361 | B1 * | 12/2009 | Green et al. ........... 709/246 |
| 2002/0035696 | A1 | 3/2002 | Thacker |
| 2003/0225844 | A1 | 12/2003 | Kuroda |
| 2005/0235164 | A1 | 10/2005 | Gassoway |
| 2008/0229416 | A1 | 9/2008 | Stewart et al. |
| 2009/0132658 | A1 | 5/2009 | Glickstein |

FOREIGN PATENT DOCUMENTS

| | | |
|---|---|---|
| JP | 11-252158 | 9/1999 |
| JP | 2000-29799 | 1/2000 |

OTHER PUBLICATIONS

U.S. Appl. No. 11/140,464 entitled "E-mail virus protection system and method", Notice of Allowability dated Oct. 31, 2008, inventors Walter Stewart et al., filed May 31, 2005, 3 pgs.

U.S. Appl. No. 09/704,790 entitled "E-mail virus protection system and method", Non-Final rejection dated May 21, 2003, inventors Walter Stewart et al., filed Nov. 3, 2000, 16 pgs.

U.S. Appl. No. 09/704,790 entitled "E-mail virus protection system and method", Non-Final rejection dated Dec. 18, 2002, inventors Walter Stewart et al., filed Nov. 3, 2000, 21 pgs.

U.S. Appl. No. 09/704,790 entitled "E-mail virus protection system and method", Final rejection dated Nov. 25, 2003, inventors Walter Stewart et al., filed Nov. 3, 2000, 18 pgs.

U.S. Appl. No. 09/704,790 entitled "E-mail virus protection system and method", Final rejection dated Oct. 23, 2003, inventors Walter Stewart et al., filed Nov. 3, 2000, 18 pgs.

U.S. Appl. No. 11/140,464 entitled "E-mail virus protection system and method", Non-Final rejection dated Apr. 3, 2008, inventors Walter Stewart et al., filed May 31, 2005, 4 pgs.

U.S. Appl. No. 11/140,464 entitled "E-mail virus protection system and method", Non-Final rejection dated Aug. 24, 2006, inventors Walter Stewart et al., filed May 31, 2005, 16 pgs.

U.S. Appl. No. 11/140,464 entitled "E-mail virus protection system and method", Final rejection dated May 24, 2007, inventors Walter Stewart et al., filed May 31, 2005, 14 pgs.

U.S. Appl. No. 09/704,790 entitled "E-mail virus protection system and method", Notice of Allowability dated May 4, 2004, inventors Walter Stewart et al., filed Nov. 3, 2000, 5 pgs.

U.S. Appl. No. 11/650,561 entitled "Computer network virus protection system and method", Notice of Allowability dated Apr. 10, 2009, inventors Walter Stewart et al., filed Jan. 9, 2007, 3 pgs.

U.S. Appl. No. 11/650,561 entitled "Computer network virus protection system and method", Non-Final rejection dated Dec. 2, 2008, inventors Walter Stewart et al., filed—Jan. 9, 2007, 7 pgs.

U.S. Appl. No. 11/650,561 entitled "Computer network virus protection system and method", Non-Final rejection dated Jun. 5, 2009, inventors Walter Stewart et al., filed Jan. 9, 2007.

U.S. Appl. No. 11/971,754 entitled "Computer Network Virus Protection System and Method", Non-Final rejection dated Aug. 7, 2009, inventors Walter Stewart et al., filed Jan. 9, 2008.

U.S. Appl. No. 11/650,561 entitled "Computer network virus protection system and method", inventors Walter Stewart et al., filed Jan. 9, 2007.

Brown, Reader Response Reveals e-mail hoax, Mar. 1998, Roanoke Times & World New start p. A5.

Cornetto, Advances in Web Technology cause e-mail client problems, Aug. 1998, InfoWorld, vol. 20, p. 13.

Horwitt, Communication Software: 104 Packages to get you on line, Nov. 1983, Business Computer Systems, vol. 2, abstract.

Microsoft, Microsoft Computer Dictionary, 1997, Microsoft Press, 3rd Edition, p. 173.

Microsoft, Microsoft Press Computer Dictionary, 1997, Microsoft Press, 3rd Sup. Edition, p. 141.

Newton, Newton's Telecom Dictionary, 1998, Telecom Books, 14.sup.th Edition, pp. 334-335.

Rad, Virus threat bytes computer users, Aug. 1998, Houston Chronicle.com, start p. 6.

"Declude Virus," http://www.declude.com'virus/index.html, 2000-2002 Computerized Horizons.

"CERT® Advisory CA-1999-04 Melissa Macro Virus," http://www.cert.org/advisories/CA-1999-04.html.

"CERT® Advisory CA-2000-04 Love Letter Worm," http://www.cert.org/advisories/CA-2000-04.html.

"VirusSafe™ FireWall," http://www.Bristol.de/virusafe2.html.

"VirusSafe™ FireWall 1.5 Software Plus-In Blocks Viruses, Vandals," http://www.cryptosoft.com/snews/feb98/16029806.htm.

Non-Final Office Action for U.S. Appl. No. 11/650,561, mailed Feb. 16, 2010, 5 pgs.

English language abstract for Japanese Pub. No. 11-167533, filed Jun. 22, 1999, 1 pg.

English language abstract for Japanese Pub. No. 11-252158, filed Sep. 17, 1999, 1 pg.

English language abstract for Japanese Pub. No. 2000-029799, filed Jan. 28, 2000, 1 pg.

U.S. Appl. No. 11/650,561 entitled "Computer network virus protection system and method", Notice of Allowability dated Jul. 23, 2010, inventors Walter Stewart et al., filed Jan. 9, 2007.

U.S. Appl. No. 11/650,561 entitled "Computer network virus protection system and method", Notice of Allowability dated Nov. 3, 2010, inventors Walter Stewart et al., filed Jan. 9, 2007.

* cited by examiner

COMPUTER VIRUS PROTECTION

CROSS REFERENCE TO RELATED APPLICATION

The present application is a continuation of U.S. patent application Ser. No. 11/140,464, filed May 31, 2005, now U.S. Pat. No. 7,506,155, which is a continuation of U.S. patent application Ser. No. 09/704,790, filed Nov. 3, 2000, now U.S. Pat. No. 6,901,519, and which claims the benefit of U.S. Provisional Application No. 60/213,254, filed Jun. 22, 2000, all of which are herein incorporated by reference in their entireties.

BACKGROUND OF THE INVENTION

1. Field of the Invention

The present invention relates generally to computer systems and computer networks. In particular, the present invention relates to a system and method for detecting and nullifying the effects of computer viruses. Still more particularly, the present invention relates to a system and method for detecting and nullifying the effects of computer viruses from messages and attachments delivered by electronic mail through a network.

2. Description of the Related Art

Computer viruses are a destructive aspect of the computer revolution that threatens its potential growth and usability. Significant time and money are lost annually combating the effects of this insidious, and seemingly endemic, problem. A computer virus is actually just an unauthorized block of executable computer code purporting to be harmless or is hidden in another valid computer program. Once the valid program is executed, the unauthorized virus code is also activated. The effect of such viruses can be simple pranks, such as causing messages to be displayed on the screen, or more serious activities, such as destroying programs and data. Once executed, they often spread quickly by attaching themselves to other programs in the system. Infected programs may in turn continue the cancerous replication by copying the virus code to still other programs. The proliferation of Internet E-mail has only accelerated the problem in that local viruses can now spread internationally in a matter of hours.

Prior art attempts to reduce the effects of viruses and prevent their proliferation by using various virus detection schemes have been only marginally successful. The reason for the limited success is that the prior art methods attempt to identify the existence of a virus before taking steps to protect a user. For example, many virus detection programs use a method known as "behavior interception," which monitors the computer or system for key system functions such as "write," "erase," "format disk," etc. When such operations occur, the virus detection program prompts the user for input as to whether such an operation is expected. If the suspect operation was not expected (e.g., the user was not operating any program that employed such a function), the user can abort the operation. Another virus detection method, known as "signature scanning," scans program code that is being copied onto the system. Again, the virus detector searches for recognizable patterns of program code, such as the program attempting to write into specific file or memory locations, that betray the possible existence of a virus. Yet another prior art approach to virus detection performs a checksum (mathematical signature) on critical programs stored on a system that are known to be free of viruses. If a virus later attaches itself to one of these programs, the checksum value—which is periodically recalculated—will be different and thus, the presence of a virus detected.

While all of these methods work to some degree, they tend to suffer from one critical drawback: They depend on recognizing the virus as a virus before instituting any protection for the user. All too often, new (unrecognized) viruses must first wreak havoc on a significant number of victims before the new virus' identifying characteristics are recognized and included in the (ever-lengthening) watch lists of the various virus protection programs available to government and industry.

SUMMARY OF THE INVENTION

The present invention overcomes the limitations of the prior art by implementing a system and method that eliminates the threat of viruses transmitted on a computer network by rendering any viruses inoperable. As discussed above, all viruses are programs. Like all programs, they are designed to run in a specific or predictable environment. Viruses depend on a host computer's operating system to recognize them as valid programs. They also depend on the host computer's central processing unit (CPU) to understand the virus' commands and obey them. Non executable entities are, by nature, incapable of launching a virus. Therefore, if a host computer converts all data received via e-mail (mail and attachments) to non-executable entities, any embedded virus is rendered inoperable. The present invention describes a method and system of virus protection that involves passing all e-mail and attachments through various conversion states that, while harmless to e-mail text and attachments, the conversions are lethal to executable code (viruses).

Even though the majority of e-mail received by a company or government agency should contain no valid executable components, a small percentage of e-mail attachments, such as "working drafts," and standard contract templates may require user updating or valid executable macros. Therefore, the present invention also describes a system and method of identifying "Approved" embedded macros and—as long as they have not been modified—allowing them to survive the virus killing conversions.

Finally, the present invention also includes a unique "sacrificial PC" system and method capable of safely executing, detecting (via examination of the results of execution), and safely recovering from potentially virus-laden e-mails.

BRIEF DESCRIPTION OF THE DRAWINGS

A preferred embodiment will be set forth in detail with reference to the drawings, in which.

DETAILED DESCRIPTION OF THE PREFERRED EMBODIMENT

Though not essential to every embodiment of this invention, the preferred embodiment makes use of the following concepts and principles:

1. Recipients of e-mails are ultimately more qualified to determine what information is acceptable than a generalized software program or system 2. If given an opportunity, a user can clearly define which e-mail types and attachments he or she does or does not wish to receive.

3. The ability of users to accept macros and other forms of executable code commonly used in modern computer generated business forms and templates must be maintained.

4. All information is potentially important to a user. Therefore, software systems, including security programs, should not arbitrarily delete or withhold e-mail content without specific knowledge and authorization of the owner of the e-mail system.

5. The value of information tends to decrease over time. Therefore, information contained in e-mails should not be unreasonably delayed.

The gatekeeper method and system described herein operate under the following rules and definitions:

1. Any macro or executable code that alters the physical appearance of an e-mail or attachment is considered by the gatekeeper to be a customized form.

2. All customized forms requiring user input must be authorized by the owner of the e-mail system.

In an effort to provide recipients with all of the contents of all e-mails and attachments (not prohibited by the owner of the e-mail system) all unauthorized form will be executed; however, the form's output (not the form itself) will be delivered to the user in a "safe" non-executable format.

The Gatekeeper method and system described defines and ability to authorize and authenticate all forms.

Figure 1:
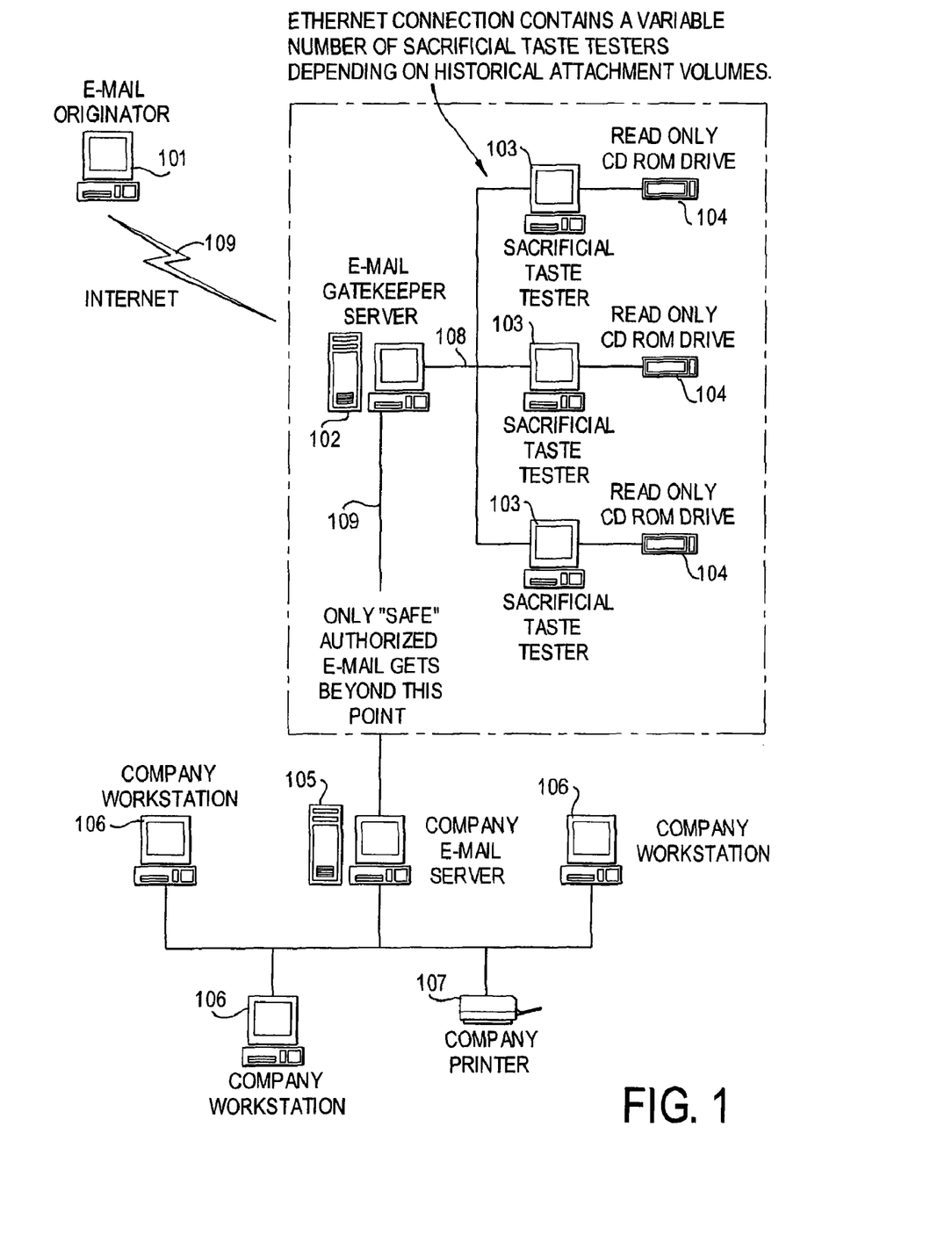
FIG. 1 shows a block diagram of an e-mail gatekeeper system.

The virus detection system and method of the present invention preferably operates on a system as depicted in FIG. 1.

Figure 2:
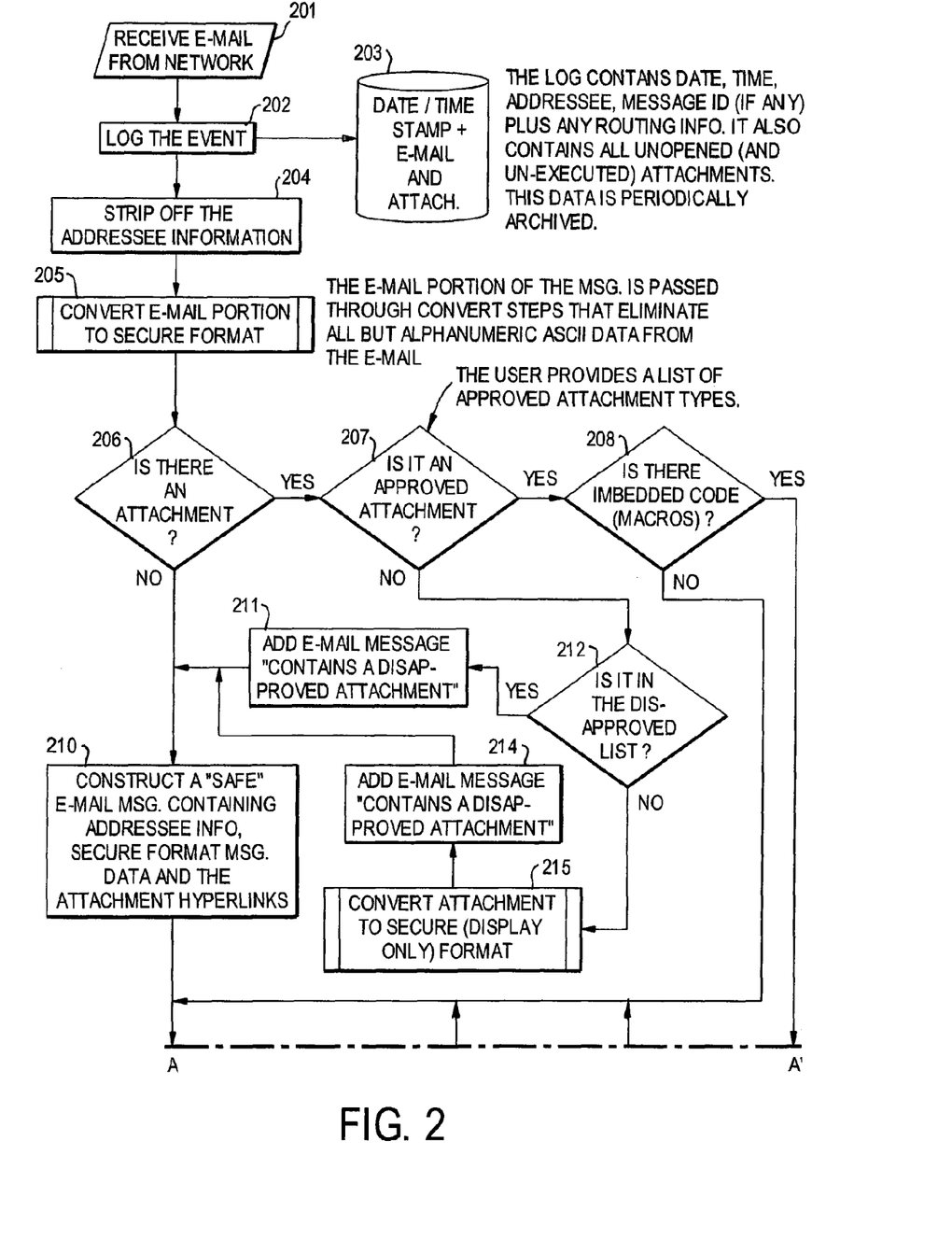
FIGS. 2 and 2A show a flow chart of operations carried out in the e-mail gatekeeper system.

An intermediary E-mail security server (102), referred to as "the Gatekeeper" intercepts all e-mail messages and attachments sent by a sender (101) via a communications network, such as the Internet (109). The arriving unopened e-mail and attachments are archived and logged (202) with a date and time stamp, plus any routing information available. Address data is then stripped off of the e-mail (204) for attachment to the "safe" e-mail constructed at (210). The e-mail portion of the Internet e-mail received from (201) is passed through a conversion process (205) that eliminates all executable code leaving only alphanumeric message text. Any imbedded hyperlinks or email addresses, while still identifiable as links or addresses, are rendered inoperable as executable "links." The Gatekeeper (102) then checks to see if the arriving e-mail contains an attachment (206). If the e-mail contains no attachment, processing continues at step (210).

If the e-mail contains an attachment, the attachment types (extensions) are validated against several lists provided by the client during the installation process. The e-mail attachment type is first checked against a list of client approved acceptable file extensions. If the attachment extension is not in the approved list, it is considered either disapproved or unknown. (212). If the attachment extension type is found in the disapproved list, a message is constructed indicating that "this e-mail contains a disapproved attachment." The disapproval message is included in the safe e-mail constructed in step (210).

Figure 2A:
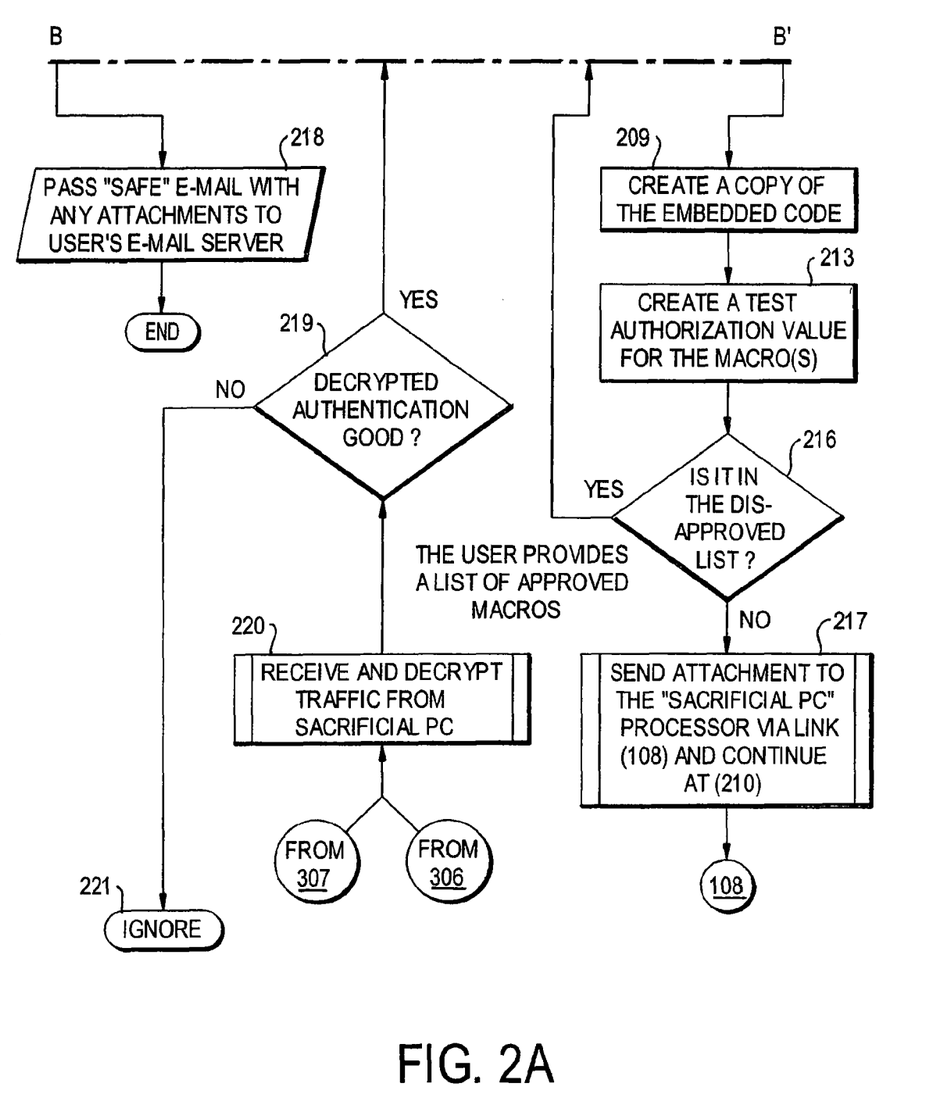

If the e-mail contains an attachment with an extension that is not in either the "disapproved" or "approved" lists, the entire attachment is passed through a conversion process (205) that eliminates all executable code leaving only alphanumeric message text. This process will generally create a readable copy of the attachment, but will not allow the attachment to open any processes or applications, including executable virus code. If the included attachment from (206) is of an approved extension type, attachment inspection processing continues at (208), which checks the approved attachment extension to see if it contains any executable code (macros). This process involves reading the attachment file's internal format and identifying any executable code, such as macros that may be present. Any executable code found is noted and identified for authentication (209). An encrypted authentication identifier is created for the executable code by passing it through an algorithm such as, a checksum or hashing algorithm (213), that uniquely identifies the string of executable code. The unique identifier is then encrypted using a key known only to the Gatekeeper program or server. The authentication identifier is then compared to a list of approved code contained by the Gatekeeper and supplied by the Client (216). Since this system and method described validates only the executable code (macros), the non-executable data portion of the attachment can safely be changed or updated interactively. If the attachment contains approved macros, the original attachment is made available to the recipient. If the attachments contain unapproved macros, the attachment is forwarded to an available sacrificial PC processor (103) via data link (108) for conversion to a non-executable format and further detailed virus testing. The method just described for detecting, authenticating, and approving a macro can be used to authenticate and approve any form of executable code embedded in an attachment or in the body of an e-mail message. Such code can include compiled programs, interpretive code, scripts, batch language, markup language code, or the like located in any part of the e-mail message, including the body and the attachments.

Figure 3:
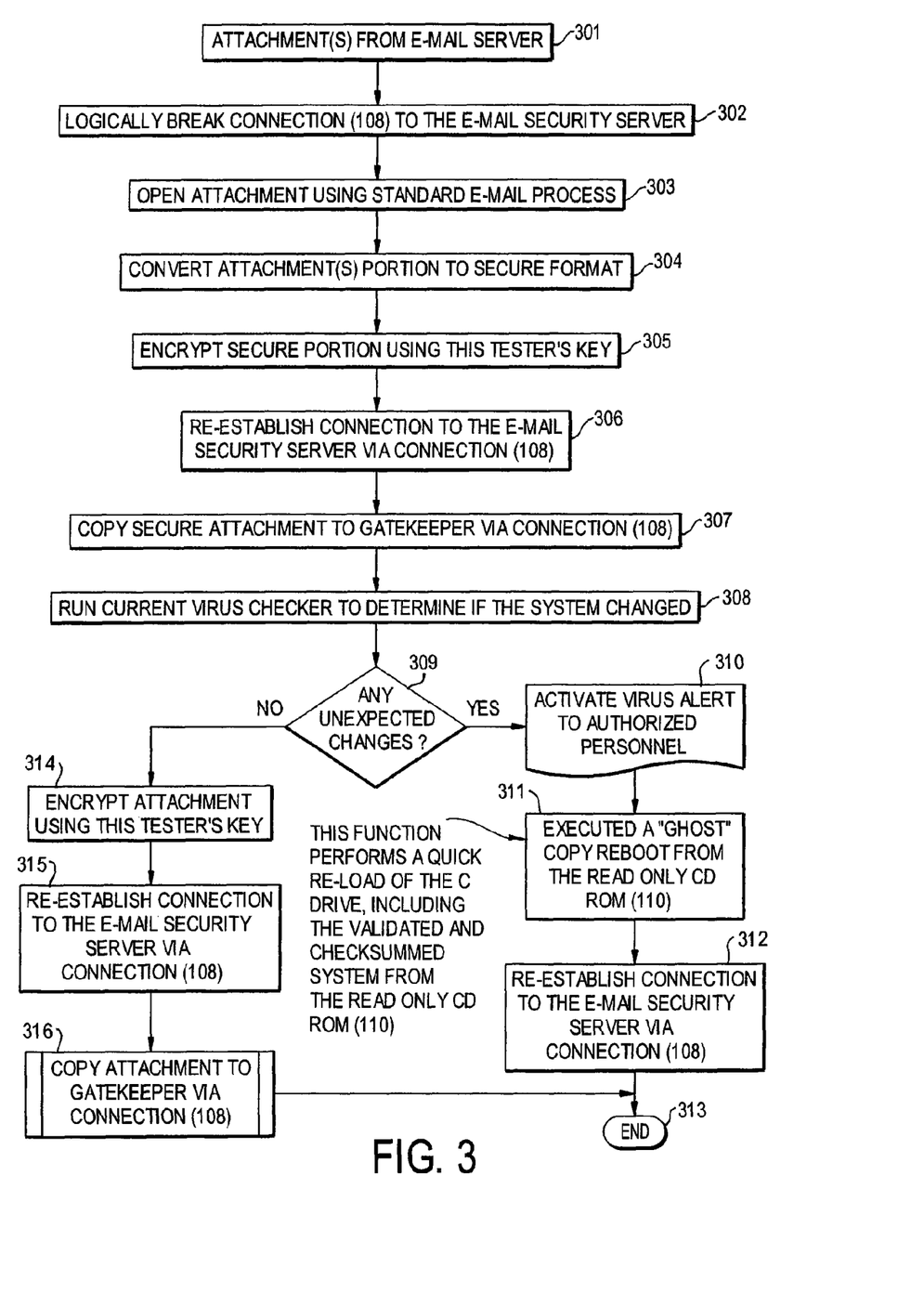
FIG. 3 shows a flow chart of operations carried out by a sacrificial processor.

Sacrificial PC processing begins with the original e-mail attachment being passed to an available sacrificial PC (105) via a data link (108) connecting the Gatekeeper server (102) with the sacrificial PC. Once the transfer of the attachment is complete the data link (108) is intentionally broken. This eliminates the possibility of any unintended communications back to the Gatekeeper. The original attachment is then opened using standard Windows application processing supplied by the client (303). The opened attachment is then passed through a process (304) which converts the attachment to a non-executable image format, such as Portable Document Format (PDF). Note there are many suitable image formats. The process would choose one selected by the client. The safe image format version of the attachment is then encrypted in the sacrificial PC's unique authentication key assigned by the Gatekeeper at startup. The data link (108) to the Gatekeeper is then re-established (306) and the encrypted non-executable attachment is returned to the Gatekeeper (307).

All communications from a sacrificial PC to the Gatekeeper are interrogated by the Gatekeeper's communications processor (220). Before being accepted by the Gatekeeper as a valid message, the data must pass a strict authentication test (219). The authentication process is as follows.

At System startup (and periodically, if desired) the Gatekeeper creates a randomly generated set of authentication parameters to be used by each sacrificial PC when communicating with the Gatekeeper. When a sacrificial PC wants to communicate with the Gatekeeper it first sends a handshake packet to the Gatekeeper identifying the specific PC requesting communication. It also sends a short (unencrypted) cleartext portion of the data to be communicated encapsulated within the handshake packet.

Once the Gatekeeper acknowledges the handshake, the sacrificial PC sends the full information packet to the Gatekeeper. A random amount of the packet has been encrypted in the sacrificial PC's unique key. The specific amount of data encrypted by the sacrificial PC was determined by one of the authentication parameters sent by the Gatekeeper at startup. The Gatekeeper decrypts all data packets it receives based on the assumed key of the specific sacrificial PC. In other words, "If you are who you say you are, you encrypted your data in the following way." Once decrypted, the Gatekeeper compares the clear text portion of the data received in the handshake packet with the decrypted data packet (219). If they match, the data is accepted; if they do not, the data is not accepted. The authentication technique is based on known "challenge and response" authentication techniques.

Once the sacrificial PC has sent the read only "safe" attachment back to the Gatekeeper, a special validation process examines the sacrificial PC to determine if any unexpected changes have occurred (308) and (309) on the sacrificial PC. Unexpected changes could include the addition or deletion of files, files that change name, extension, or content unexpectedly, (including morphing of the tested attachment itself), attempted sensing of the date and time features of the sacrificial PC, etc.

Also, when the opportunity is available, as with attachments created using the Microsoft suite of office products, the sacrificial PC processor takes advantage of the "Enable Macros" "Disable Macros" feature. This built-in feature makes it possible to open a document without allowing any embedded code (macros) to execute. Two copies of the same document can then be created, one created with macros executed and one created without macros executed. The two copies of the same document can then be examined to determine if executing the macro had any effect on the information content of the document. By comparing the two documents, the sacrificial PC can determine whether or not the macro is relevant to the particular document being tested.

If execution of the macro was necessary to produce the information contained in the tested document, then the macro's contribution is contained in the print image copy of the document produced by the sacrificial PC when it executed the document with macros enabled. This is the copy that is sent to the recipient.

Similarly, if testing the document with "macros disabled" has no impact on the content of the document, then the suspect macro is not necessary. It logically follows then, that the suspect macro is either irrelevant to the content of the particular version of the document being tested or, it is a virus. In either case, the sacrificial PC has intercepted and nullified the suspect macro's impact on the recipient.

Any unexpected changes in the system trigger a virus alert. Standard user security processes alert all authorized personnel (310). A special "ghosting" reload of the operating system then takes place. The process is as follows.

Each Sacrificial PC is configured with two hard drives. Each hard drive is configured with a single active partition and contains a safe copy of the operating system obtained from the read-only device (104). The designated active partition—defined at start-up—is "toggled" between the two physical hard drives. This is done to increase the speed of reloading and to maximize the availability of sacrificial PCs. The unused drive—which is the one used to test the last attachment—is re-loaded, via ghosting software (311), with a fresh copy of the operating system obtained from the read only CD ROM (104). The connection between the Gatekeeper (102) and the sacrificial PC (105) is then re-established.

Once the sacrificial PC is re-ghosted, it is brought back on line and the GateKeeper assigns it a new authentication Key and encryption length parameter.

Once the Gatekeeper sends data to a sacrificial PC, it notes the time the data was sent. If no data is received back from a sacrificial PC within a specified period of time (typically two minutes), the Gatekeeper assumes the sacrificial PC has become the victim of a virus and died. When this occurs, the Gatekeeper signals a virus alert and requests human intervention to recover the dead sacrificial PC.

The method and system described above can also be implemented with the sacrificial PC implemented as a virtual machine or environment in the operating system of another computer. This computer could be the gatekeeper, an e-mail server or any other computer.

The method and system described above can also be implemented with the gatekeeper system implemented as part of another system, such as a component of an already existing e-mail server.

The gatekeeper system and method described uses the file and macro authentication and encrypted client approval techniques described above to protect itself from both internal and external "hacking" attacks that may attempt to substitute, modify, destroy or otherwise nullify gatekeeper files and programs.

While a preferred embodiment has been set forth in detail above, those skilled in the art who have reviewed the present disclosure will readily appreciate that other embodiments can be realized within the scope of the invention. For example, the use of certain hardware, operating systems, or the like should be construed as illustrative rather than limiting. Therefore, the present invention should be construed as limited only by the appended claims.

What is claimed is:

1. A method comprising:
   receiving a message containing a virus comprising executable code;
   converting the executable code from an executable format to a non-executable format, such that the virus is rendered inoperable, using an application-level process that retains semantic content of the message; and
   forwarding the non-executable format over a network to a target recipient of the message.

2. The method of claim 1, wherein the executable code is at least one of compiled code, interpretive code, and markup language code.

3. The method of claim 1, wherein the executable code is contained in a body of the message.

4. The method of claim 3, wherein the executable code comprises a hypertext link.

5. The method of claim 4, wherein the converting comprises deactivating the hypertext link.

6. The method of claim 5, wherein the deactivated link is identifiable as a hypertext link.

7. The method of claim 1, wherein the executable code is contained in an attachment.

8. The method of claim 7, wherein the converting comprises:
   forwarding the executable code to a sacrificial server to convert the executable code from the executable format to the non-executable format; and
   receiving from the sacrificial server the non-executable format.

9. The method of claim 8, wherein the converting further comprises examining the sacrificial server for virus activity.

10. The method of claim 9, wherein the converting further comprises:
    rebooting the sacrificial server from a safe copy of an operating system obtained from a read-only device.

11. The method of claim 9, wherein communications with the sacrificial server are authenticated using a challenge and response technique.

12. The method claim 8, wherein the converting further comprises:
   disconnecting a data link to the sacrificial server after the forwarding the executable code to the sacrificial server; and
   establishing the data link to the sacrificial server before the receiving the non-executable format from the sacrificial server.

13. The method of claim 7, wherein the converting comprises:
   maintaining a list of approved attachment types;
   determining whether the attachment is of a type which is in the list of approved attachment types; and
   if the attachment is not of a type which is in the list of approved attachment types, informing the target recipient that a message containing a non-approved attachment has been received.

14. The method of claim 1, wherein the converting comprises:
   maintaining a list of approved executable code;
   determining whether the executable code is in the list of approved executable code; and
   deactivating the executable code if the executable code is not in the list of approved executable code.

15. The method of claim 14, wherein:
   the list of approved executable code includes information for determining whether the approved executable code has been altered; and
   the converting further comprises:
      determining whether the executable code has been altered; and
      deactivating the executable code if the executable code has been altered.

16. The method of claim 15, wherein the determining whether the executable code has been altered is performed through an algorithmic technique.

17. The method of claim 16, wherein the algorithmic technique is at least one of a check-summing technique and a hashing technique.

18. The method of claim 1, wherein the message is an e-mail message.

19. The method of claim 1, wherein the non-executable format is an image format.

20. The method of claim 1, wherein converting the executable code comprises:
   forming a first copy and a second copy of at least a portion of the message containing the executable code;
   executing the executable code in the first copy but not the second copy; and
   after the executable code in the first copy has been executed, comparing the first copy to the second copy to determine an effect of the executable code.

21. A system comprising:
   means for receiving a message containing a virus comprising executable code;
   means for converting the executable code from an executable format to a non-executable format, such that the virus is rendered inoperable, using an application-level process that retains semantic content of the message; and
   means for forwarding the non-executable format over a network to a target recipient of the message.

22. The system of claim 21, wherein the executable code is at least one of compiled code, interpretive code, and markup language code.

23. The system of claim 21, wherein the executable code is contained in a body of the message.

24. The system of claim 23, wherein the executable code comprises a hypertext link.

25. The system of claim 24, wherein the means for converting comprises means for deactivating the hypertext link.

26. The system of claim 25, wherein the deactivated link is identifiable as a hypertext link.

27. The system of claim 21, wherein the executable code is contained in an attachment.

28. The system of claim 27, wherein the means for converting comprises:
   means for forwarding the executable code to a sacrificial server to convert the executable code from the executable format to the non-executable format; and
   means for receiving from the sacrificial server the non-executable format.

29. The system of claim 28, wherein the means for converting further comprises means for examining the sacrificial server for virus activity.

30. The system of claim 29, wherein communications with the sacrificial server are authenticated using a challenge and response technique.

31. The system of claim 29, wherein the means for converting further comprises:
   means for rebooting the sacrificial server from a safe copy of an operating system obtained from a read-only device.

32. The system claim 28, wherein the means for converting further comprises:
   means for disconnecting a data link to the sacrificial server after the forwarding the executable code to the sacrificial server; and
   means for establishing the data link to the sacrificial server before the receiving the non-executable format from the sacrificial server.

33. The system of claim 27, wherein the means for converting comprises:
   means for maintaining a list of approved attachment types;
   means for determining whether the attachment is of a type which is in the list of approved attachment types; and
   if the attachment is not of a type which is in the list of approved attachment types, means for informing the target recipient that a message containing a non-approved attachment has been received.

34. The system of claim 21, wherein the means for converting comprises:
   means for maintaining a list of approved executable code;
   means for determining whether the executable code is in the list of approved executable code; and
   means for deactivating the executable code if the executable code is not in the list of approved executable code.

35. The system of claim 34, wherein:
   the list of approved executable code includes information for determining whether the approved executable code has been altered; and
   the means for converting further comprises:
      means for determining whether the executable code has been altered; and
      means for deactivating the executable code if the executable code has been altered.

36. The system of claim 35, wherein the means for determining whether the executable code has been altered comprises means for performing an algorithmic technique.

37. The system of claim 36, wherein the algorithmic technique is at least one of a check-summing technique and a hashing technique.

38. The system of claim 21, wherein the message is an e-mail message.

39. The system of claim 21, wherein the non-executable format is an image format.

40. The system of claim 21, wherein the means for converting the executable code comprises:
- means for forming a first copy and a second copy of at least a portion of the message containing the executable code;
- means for executing the executable code in the first copy but not the second copy; and
- means for comparing the first copy to the second copy to determine an effect of the executable code, after the executable code in the first copy has been executed.

41. A processor configured to execute program code that causes the processor to perform a method comprising:
- receiving a message containing a virus comprising executable code;
- converting the executable code from an executable format to a non-executable format, such that the virus is rendered inoperable, using an application-level process that retains semantic content of the message; and
- forwarding the non-executable format over a network to a target recipient of the message.

42. The method of claim 41, wherein the executable code is at least one of compiled code, interpretive code, and markup language code.

43. The method of claim 41, wherein the executable code is contained in an attachment.

44. The method of claim 43, wherein converting the executable code comprises:
- forwarding the executable code to a sacrificial server to convert the executable code from the executable format to the non-executable format; and
- receiving from the sacrificial server the non-executable format.

45. A non-transitory computer readable storage medium having instructions stored thereon, the instructions comprising:
- instructions to receive a message containing a virus comprising executable code;
- instructions to convert the executable code from an executable format to a non-executable format, such that the virus is rendered inoperable, using an application-level process that retains semantic content of the message; and
- instructions to forward the non-executable format over a network to a target recipient of the message.

46. A method comprising:
- receiving a message containing executable code;
- converting the executable code from an executable format to a non-executable format, such that the executable code is rendered inoperable, using an application-level process that retains semantic content of the message; and
- forwarding the non-executable format over a network to a target recipient of the message.

47. The method of claim 46, wherein the executable code is contained in a body of the message.

48. The method of claim 47, wherein the executable code comprises one of a hypertext link and an e-mail address and the converting comprises deactivating one of the hypertext link and the e-mail address.

* * * * *

UNITED STATES PATENT AND TRADEMARK OFFICE
CERTIFICATE OF CORRECTION

| | | |
|---|---|---|
| PATENT NO. | : 7,979,691 B2 | Page 1 of 1 |
| APPLICATION NO. | : 12/392768 | |
| DATED | : July 12, 2011 | |
| INVENTOR(S) | : Stewart et al. | |

It is certified that error appears in the above-identified patent and that said Letters Patent is hereby corrected as shown below:

Column 7, line 1, in Claim 12, delete "method" and insert -- method of --.

Column 8, line 27, in Claim 32, delete "system" and insert -- system of --.

Signed and Sealed this

Fifteenth Day of November, 2011

David J. Kappos
*Director of the United States Patent and Trademark Office*